United States Patent [19]

Scratchard

[11] Patent Number: 5,251,722
[45] Date of Patent: Oct. 12, 1993

[54] REAR-DISCHARGE CONCRETE MIXER HAVING REAR-END TRANSMISSION CONTROL

[75] Inventor: Leroy G. Scratchard, York, Pa.

[73] Assignee: T. L. Smith Machine Co., Inc., Springville, N.Y.

[21] Appl. No.: 765,663

[22] Filed: Sep. 26, 1991

[51] Int. Cl.⁵ .............................................. B60K 26/00
[52] U.S. Cl. ....................................... 180/321; 180/325
[58] Field of Search ................ 180/321, 315, 322, 324, 180/336, 325

[56] References Cited

U.S. PATENT DOCUMENTS

| 4,527,656 | 7/1985 | Walbridge | 180/321 |
| 4,846,581 | 7/1989 | Osterlund et al. | 180/321 |
| 4,955,304 | 9/1990 | Spenk et al. | 180/321 |

*Primary Examiner*—Kenneth R. Rice
*Attorney, Agent, or Firm*—Waldron & Associates

[57] ABSTRACT

A concrete delivery truck having an electronically controlled transmission is shown and described. There are two (2) electronic control units, one in the truck cab and one at the rear of the truck. The rear electronic control is operative when the cab electronic control is in an neutral position. An actuator interface is connected to the cab and rear-mounted electrical control units for selecting the control unit and providing signals for the electronically controlled transmission.

14 Claims, 4 Drawing Sheets

REAR-DISCHARGE CONCRETE MIXER HAVING REAR-END TRANSMISSION CONTROL

BACKGROUND OF THE INVENTION

1. Field of the Invention

This invention pertains to a service-type vehicle such as a rear-discharge concrete-mixing and transit drum mixer. This invention eliminates difficulty experienced by drivers in maneuvering the vehicle to a dispensing site by providing transmission control at the rear of the vehicle, which permits easy manipulation and dispensing.

This invention pertains to a vehicle, structured to carry a typical rear-discharge concrete-mixing in-transit drum from a loading station to a dispensing site. This invention eliminates the difficulty experienced by drivers in maneuvering the vehicle at the dispensing site by providing controls at the rear of the vehicle. From this rear-end location, the vehicle is easily and safely maneuvered.

2. Statement of the Prior Art

The prior art shows remote-control steering for a material-handling vehicle, such as a concrete-mixer vehicle where rear-end control is provided for vehicle steering, vehicle braking, and vehicle transmission operation. U.S. Pat. No. 4,846,581 shows a system providing for steering, braking, and transmission control where the transmission is controlled by hydraulic controls for the transmission operation from the rear of the vehicle.

In the prior art such as is illustrated by the U.S. Pat. No. 4,846,581, it is known to provide for forward and reverse movement, steering, and speed control from the rear of the vehicle. This control permits maneuvering of the vehicle and the discharge more effectively at the dispensing site.

In an article titled "SAE Technical Paper Series 881830," the Eaton CEEMAT (converter enhanced electronically managed automatic transmission) dated Nov. 7, 1988, there is disclosed an electronically managed transmission which utilizes an electronic control unit (ECU). The electronic control unit has as inputs throttle position, engine RPM, transmission input RPM, vehicle speed, range box shifter position, and power from a battery. Applicant utilizes this control system in the preferred mode of this invention, and hereby incorporates by reference into this disclosure the "SAE Technical Paper Series 881830."

SUMMARY OF THE INVENTION

This invention pertains to effective and efficient control for maneuvering a dispensing vehicle to the dispensing site. This invention utilizes an electrical control unit (ECU) for controlling the transmission in forward, neutral, and reverse directions. When control of the transmission is transferred to the rear of the vehicle, the invention provides for limitation of the range of gearing available for driving the vehicle.

This invention utilizes an electronically managed automatic transmission where control is provided at the cab and rear-end of the truck by separate ECU's. The invention further provides an actuator interface connected to both the cab and rear-mounted ECU's and to the electronically managed transmission. The invention further contemplates a means for transferring control of the transmission from the cab to the rear electronic control unit and from the rear electronically controlled unit to the cab electronically controlled unit. Transfer may be responsive to placement of an electronically controlled unit (cab or rear) in a neutral position.

The invention further contemplates the use of an electronic lock-out means for preventing the transmission form entering one or more gear drive positions when control is in the rear electronically controlled unit.

It is an object of this invention to provide an ECU for transmission control at the rear of the vehicle, thereby eliminating the necessity of hydraulic and/or pneumatic controls between the rear and the cab/transmission.

These and other objects of the invention will become apparent to those skilled in the art to which the invention pertains from reading of the following specification when taken in light of the annexed drawings.

DETAILED DESCRIPTION OF THE PREFERRED EMBODIMENT

Figure 1:
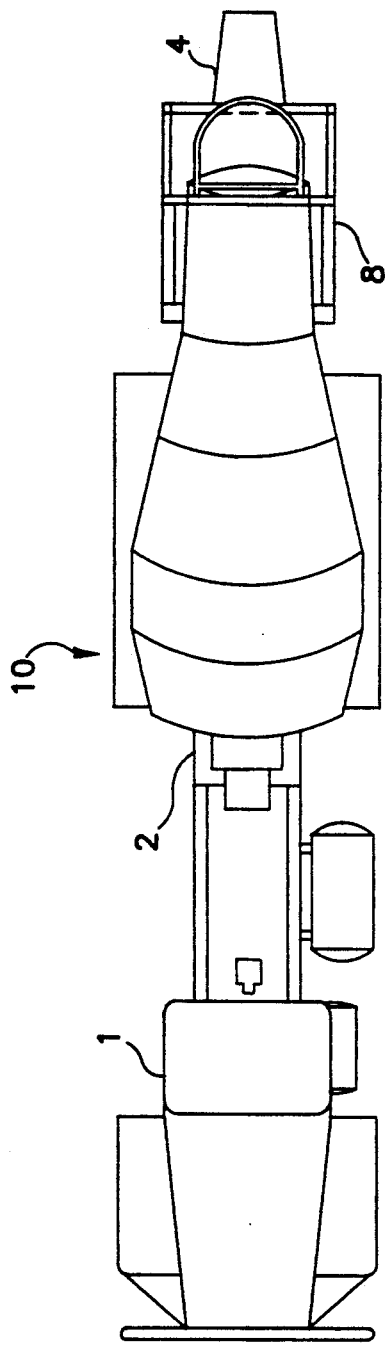
FIG. 1 is a top view of a rear-discharge concrete-mixing vehicle showing the dispensing chute and a rear platform where the operator can maneuver the vehicle and the discharge chute at the dispensing site.
Figure 2:
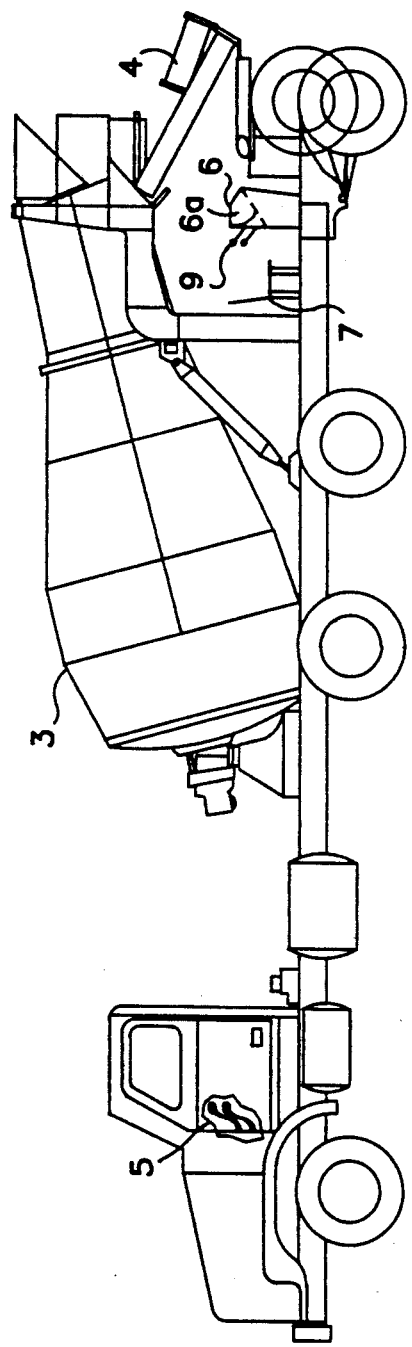
FIG. 2 is a side view of a rear-discharge concrete-mixing vehicle showing the dispensing chute and a rear platform whereby the operator can maneuver the vehicle and the discharge chute at the dispensing site.

Referring now in more detail to the drawings, FIGS. 1 and 2 show a rear-discharge concrete mixer (10) having a front cab (1) with controls (5) for over-the-road operation of the vehicle, an in-transit mixing drum (3) having a discharge chute (4) and a rear-control platform (8) with controls (9) and a seat (7) thereon, all mounted on a truck chassis (2). Upon reaching the dispensing site, the usual operation is for the operator to back the dispensing vehicle to the dispensing site. This often requires the assistance of another person to help direct the operator to maneuver the vehicle rearward. This invention eliminates the time and labor used in maneuvering the vehicle to the dispensing site.

Figures 3, 3A:
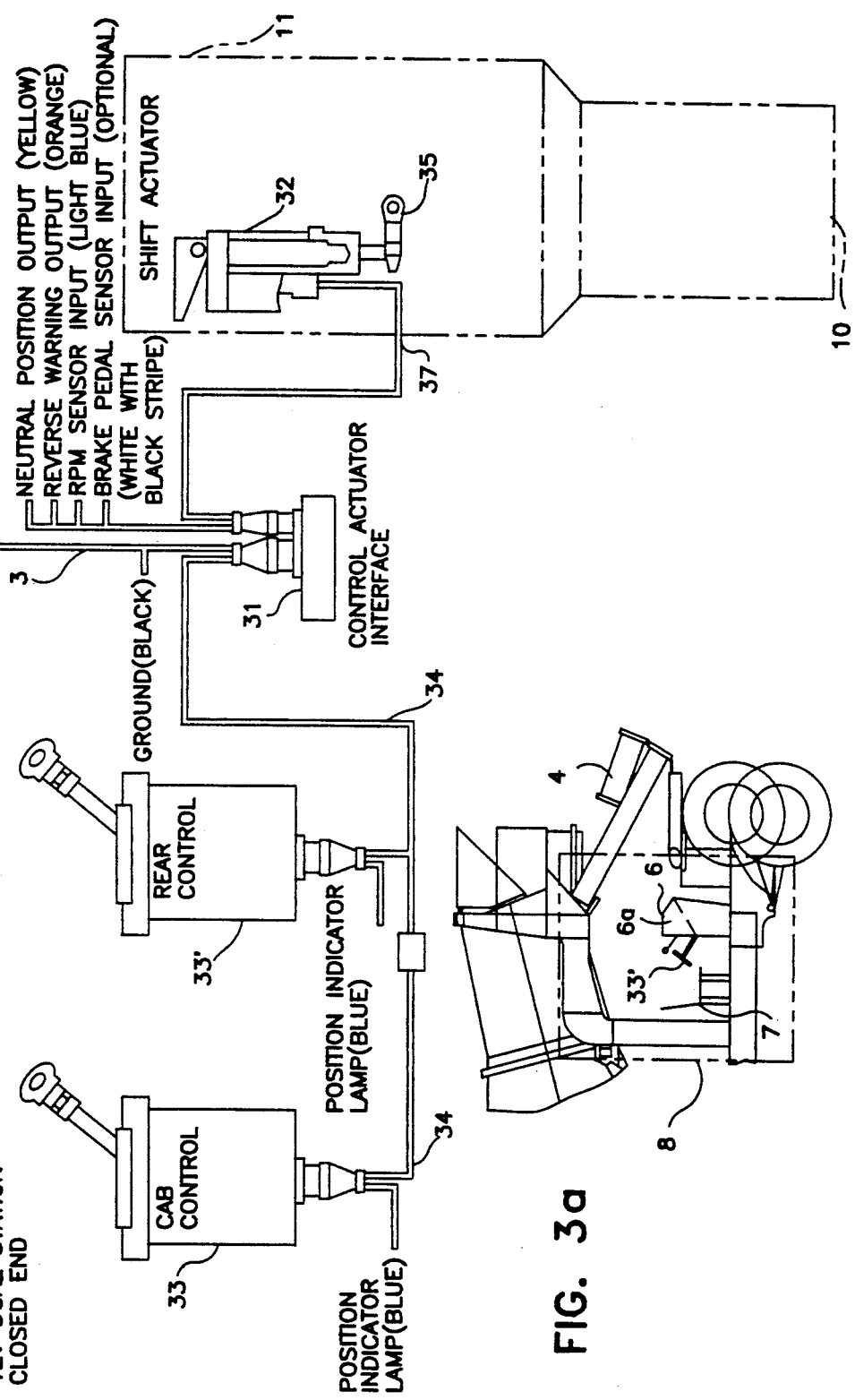
FIG. 3 is a schematic drawing of the vehicle controls for both over-the-road operation from the front cab and for maneuvering the vehicle from the rear platform at the construction site.

In FIG. 3 there is shown a block diagram drawing of the cab ECU (33), the rear ECU (33'), the power line (3), the actuator interface (31), wire (34) connecting the cab electronic control unit to the interface (31), and wire (34') connecting the rear ECU to the actuator interface (31). Wiring (37) connects the actuator interface (31) to the input (32) of the transmission (11).

The motor (10) is connected to transmission (11) for supplying power to the vehicle wheels as is known in the art.

Upon arriving at the dispensing site where rear-mode maneuverability is desired, the driver places shift selector (33) in its designated neutral position, thus signalling through cable (34) to the control interface (31) to cable (37) the shift actuator (32) to place the transmission (11) in a neutral position. With the transmission in neutral, the driver can now leave the front cab and upon mounting the rear platform (8) and sitting on seats (7) can, by moving rear shift selector (33') mounted on console panel (6a) which is mounted on console (6), select forward and rearward travel of the vehicle. The rear-shift selector (33') signals through cable (34') to the control actuator interface (31) to actuate shift actuator (32) through cable (37). Shift actuator (32) acts on lever (35) of the transmission selector arm on transmission (11) and places the transmission in the drive mode selected by the operator at shift selector (33').

Power for the shift selectors (33 and 33'), the actuator interface (31), and transmission controls (32) is provided by power supplied to the actuator (31) at power cable (3).

Upon completion of concrete dispensing, the driver (at his discretion) returns to the cab control by placing the rear-shift selector (33') in a neutral position. This activates shift selector (33) in the front of the cab by signalling control actuator interface. The neutral position signal from actuator (33') is also passed to transmission control (32) by way of the cable (37) and the actuator interface (31). Thus, placement of control (33') in neutral also places the transmission (11) in neutral. When the transmission (11) is in neutral, the driver may leave the rear platform (8) and return to the cab (1).

Figure 4:
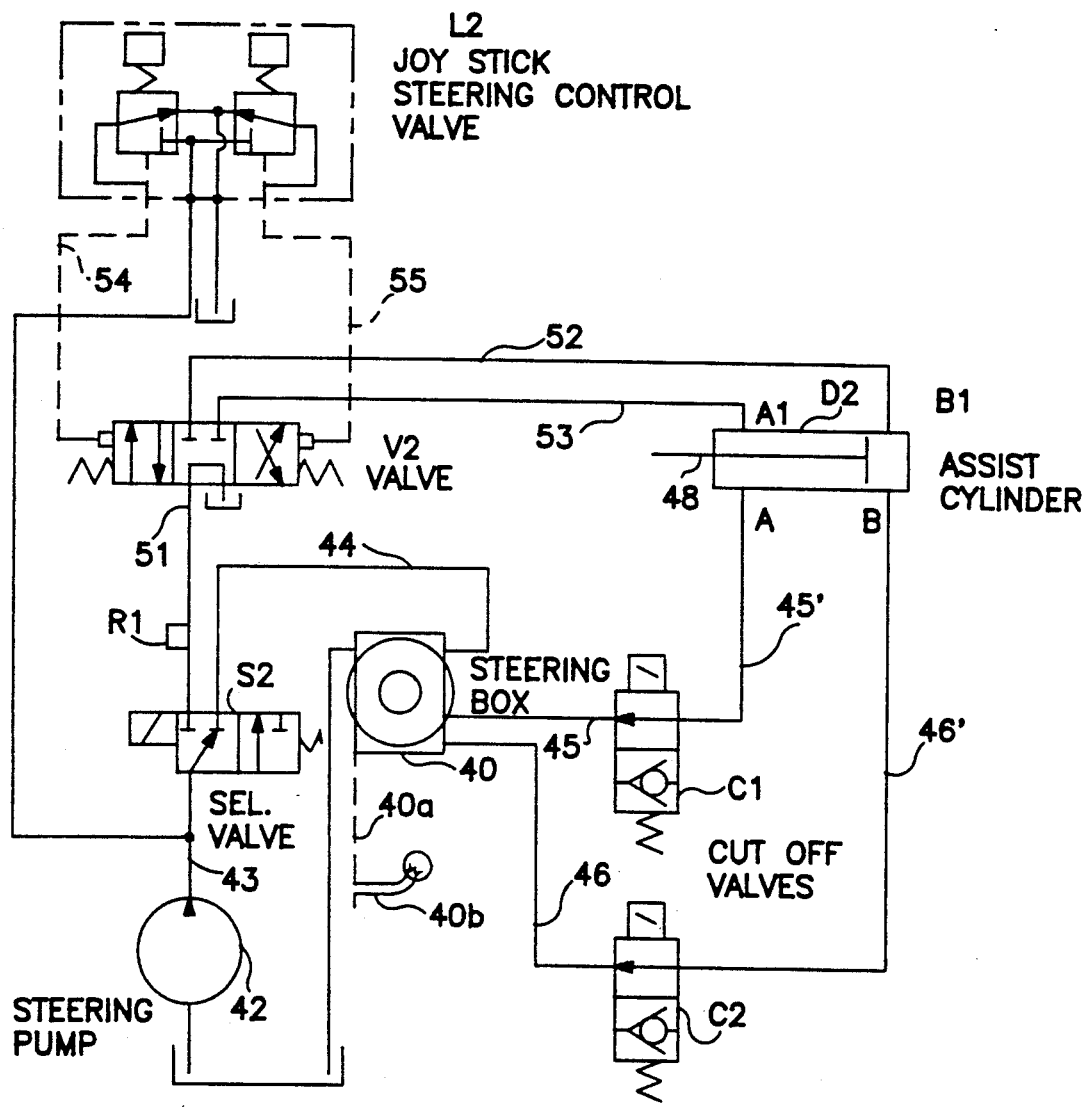
FIG. 4 is a schematic drawing showing the steering controls for disconnecting the vehicle conventional steering system and connecting the rear-steer controls.

Steering box (40), FIG. 4, is connected by a series of linkages (40a) to the driver's side steering arm (40b). (The steering arm is an integral part of the front axle.) Fluid normally flows from the vehicle's steering system pump (42) through hydraulic lines (43) to the selector valve (S2), (L2) control, and from selector valve (S2) to the vehicle's steering box (40) through line (44). Steering box (40) has a hydraulic control valve built into its design. By means of this valve, fluid is sent to cut-off valves (C1) and (C2) thru lines (45) and (46), and from cut-off valves (C1) and (C2) to port (A) or (B) of assist cylinder (D2) by lines (45') and (46'). Cut-off valves (C1) and (C2) receive function signal from pressure switch (R1) when line (51) is pressurized by activation of switch (S2). The assist cylinder's piston (48) is connected directly to the passenger side steering arm of the front axle. When the operator activates switch (S2) in the cab, FIG. 4, said switch functions to divert the normal flow of oil of the power steering pump (42) from steering box (40) and allows oil to flow to a high pressure hydraulic control valve (V2) through line (51). From control valve (V2) flow can be diverted to ports (A') and (B') of the assist cylinder (D2) through lines (52) or (53); (V2) is connected to rear platform steering control valve (L2) on panel (6a) through low pressure lines (54) and (55). At this point, the control of the vehicle's steering has been transferred from the front cab to the rear console (6) mounted on the rear platform (8).

Upon completion of the dispensing operation, the operator returns to the front cab, deactivates switch (S2) in the front cab, returning the oil flow through the normal sequence from pump (42) to steering box (40), and providing steering for road travel.

Figure 5:
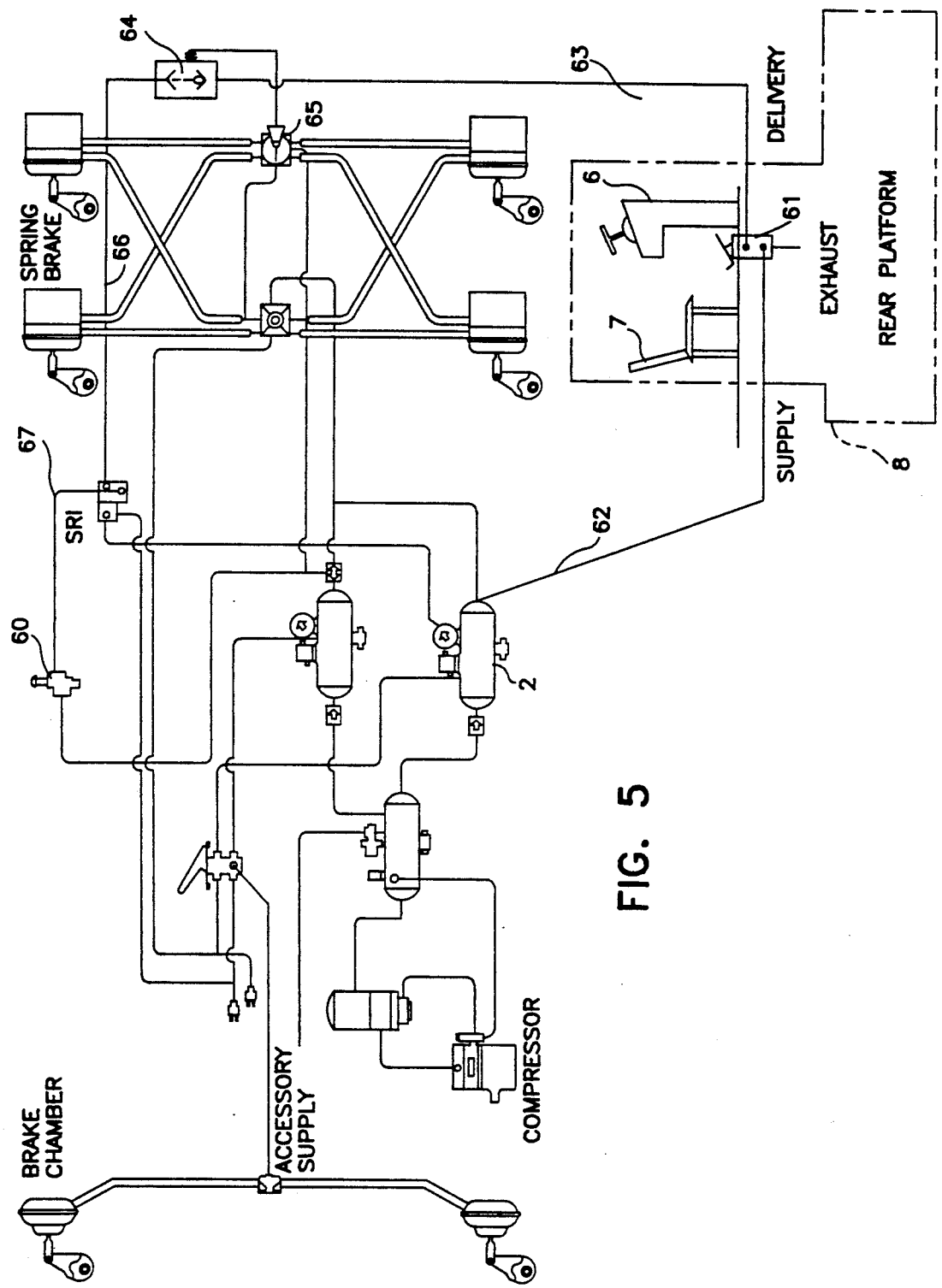
FIG. 5 is a schematic drawing of the brake system for front and rear drive modes.

Schematic FIG. 5 is a typical six-wheel truck air brake system, and those knowledgeable in the state of the art know substitution of manufactures valving does not detract from the concept and safety requirements of this typical system. To provide a brake control at the rear platform, an additional treadle (61') has been provided. Supply line (62) from #2 air tank is connected to the supply side of treadle (61). Delivery line (63) is connected to shuttle valve (64) which is teed to rear park brake control valve (65). Line (66) and front-end cab park brake control valve (60) is also connected to second supply port on shuttle valve (64) by line (67) thru standard brake valve (SR1). This provides dual control of park brakes from rear platform (8).

What is claimed is:

1. A vehicle having a rear mounted control station comprising in combination:
   A. an electronically controlled automatic transmission having a cab mounted electrical control unit and a rear mounted electrical control unit;
   B. an actuator interface connected to said cab mounted electrical control unit and to said rear mounted electrical control unit to actuate said electronically controlled automatic transmission;
   C. said actuator interface including means for transferring control of said transmission between said cab mounted electrical control unit in response to a signal generated when said transmission gear selectors is in a designated position, said signal originating at the location of the controlling electrical control unit.

2. The apparatus in accordance with claim 1 further comprising an electronic lock-out means for preventing said transmission from entering into at least one gear drive when control is transferred to the rear ECU.

3. The apparatus in accordance with claim 1 further comprising means for transferring control from the cab-mounted ECU to the rear-mounted ECU when a signal is received by said means for transferring control from said cab.

4. The apparatus in accordance with claim 1 wherein said signal is generated when said transmission is in a designated position.

5. The apparatus in accordance with claim 1 wherein said designated position is placement of the transmission in its neutral position.

6. The apparatus in accordance with claim 1 wherein said actuator interface transfers control from the rear-mounted ECU to the cab-mounted ECU when a signal is received from said rear ECU.

7. The apparatus in accordance with claim 1 further comprising means for signaling said actuator interface when said rear-mounted ECU is placed in a designated position.

8. The apparatus in accordance with claim 1 wherein said designated position is the neutral position of the transmission.

9. The apparatus in accordance with claim 1 wherein only one of said cab and rear-mounted ECU units is operative at any given time.

10. The apparatus in accordance with claim 1 wherein when both the front and rear ECU's are simultaneously in neutral, either ECU may be operated by actuation by an operator.

11. The apparatus in accordance with claim 1 wherein said cab and rear-mounted ECU's are located so that the vehicle operator has access to at least one other vehicle control.

12. The apparatus in accordance with claim 1 wherein said cab and rear ECU's and said transmission receive power from said actuator interface, and said actuator is connected to a vehicle power supply.

13. The apparatus in accordance with claim 1 further comprising interlock means for preventing simultaneous control by actuation of said front and rear ECU's.

14. The apparatus in accordance with claim 1 wherein said rear ECU provides for operation of said transmission in a select number of gears which is less than the number of gears which can be operated by said cab-mounted ECU.

* * * * *